(12) United States Patent
Galban et al.

(10) Patent No.: US 7,338,001 B2
(45) Date of Patent: *Mar. 4, 2008

(54) HOUSEHOLD FOOD PREPARATION APPLIANCE FOR PREPARING LIQUID PRODUCTS

(75) Inventors: Rémi Galban, Ibos (FR); Marc Suberbie, Momeres (FR)

(73) Assignee: SEB S.A., Ecully (FR)

( * ) Notice: Subject to any disclaimer, the term of this patent is extended or adjusted under 35 U.S.C. 154(b) by 129 days.

This patent is subject to a terminal disclaimer.

(21) Appl. No.: 11/300,651

(22) Filed: Dec. 15, 2005

(65) Prior Publication Data

US 2006/0169812 A1    Aug. 3, 2006

(30) Foreign Application Priority Data

Dec. 16, 2004  (FR) .................................. 04 13382

(51) Int. Cl.
*B02C 1/08* (2006.01)
(52) U.S. Cl. .................................. 241/282.1
(58) Field of Classification Search .................. 241/91, 241/92, 282.1, 281.1
See application file for complete search history.

(56) References Cited

U.S. PATENT DOCUMENTS

| 4,111,372 A | * | 9/1978 | Hicks et al. ............... 241/37.5 |
| 5,979,806 A | * | 11/1999 | Borger et al. .............. 241/37.5 |
| 6,007,011 A | | 12/1999 | McBain |

FOREIGN PATENT DOCUMENTS

FR     2 707 187 A     1/1995

* cited by examiner

*Primary Examiner*—Faye Francis
(74) *Attorney, Agent, or Firm*—Browdy and Neimark, PLLC

(57) ABSTRACT

A food processing appliance having: a drive shaft coupled to a motor; a bowl having a hollow sleeve that extends upwardly from its bottom; a lid for closing the bowl; and a processing tool that includes a hub having an opening that extends from its lower end, and arranged to be fitted over the sleeve. The tool has a drive element coupleable to the drive shaft to be rotated by the motor. The lid is constructed to be placed on the bowl in a manner that leads to a reduction in the volume enclosed between the bowl and the lid while maintaining a degree of fluid tightness. The hub is provided with a vent and encloses a passage that is distinct from the lower drive element and that extends between the vent and the opening to allow escape of air from the volume to a region outside of the bowl.

22 Claims, 4 Drawing Sheets

HOUSEHOLD FOOD PREPARATION APPLIANCE FOR PREPARING LIQUID PRODUCTS

BACKGROUND OF THE INVENTION

The present invention relates to household food preparation appliances and concerns more particularly household food preparation appliances that include a motor installed in a housing, a working bowl having a bottom provided with an upwardly extending, hollow cylindrical sleeve and arranged to be mounted on the motor housing, a processing tool mounted for rotary movement within the bowl, and a lid provided to close the bowl.

In appliances of this type, the bowl is removable from the motor housing and the rotatable working tool is removable from the bowl. The tool has a tubular wall presenting a lower opening provided to fit over the sleeve and the sleeve permits the passage of a component, such as a shaft that extends from the motor housing, for rotating the tool. The tool has a lower drive element provided to cooperate with the drive shaft. An appliance of this type is disclosed in, for example, the patent document WO 98/43522, the disclosure of which is incorporated herein by reference.

One drawback of these appliances is that they are poorly adapted to the processing of liquids, particularly because of the risk that liquid will be caused to flow upwardly along the outer wall of the sleeve and then through the sleeve into the motor housing.

BRIEF SUMMARY OF THE INVENTION

The present invention provides a novel household food processing appliance of the type described above that allows the processing of liquids in a closed bowl without excessively limiting the prepared volume and while preventing the flow of liquid into the motor housing below the bowl.

To this end, the invention is based on a household food processing appliance including a motor housing containing a motor and a drive shaft, a working bowl having a sleeve, a lid, and a rotatable processing tool that includes a hub that is elongated along an axis. The hub forms a tube with an axial opening extending from its bottom, the tube being fitted over, or capping, the sleeve. The working tool comprises a lower drive element that is driven by the drive shaft of the motor. According to the invention, the lid is capable of being placed on the bowl in a manner that leads to a reduction in the volume of the enclosure provided by the bowl and the lid while maintaining a certain fluid tightness, and a vent arranged in an outer wall of the hub communicates with the lower axial opening by a passage distinct from the lower drive element.

The tube is provided to cap the sleeve when the tool is placed in the bowl and the lower drive element is coupled to be driven by the drive shaft. Because of the passage, the vent permits the air in the space enclosed by the bowl and the lid to be placed in communication with the sleeve when the tube extends into the liquid to be processed. Liquid can thus be easily prevented from rising between the tube and the sleeve when the user places the lid on the bowl.

According to an advantageous embodiment of the invention, the enclosure formed by the bowl and the lid includes a sealing joint, which facilitates the attainment of a good seal between the lid and the bowl.

According to another advantageous embodiment of the invention, the lid has a lower edge, or rim, that comes to lodge against an upper edge of the bowl, the lower rim and the upper edge having a reduced play. Although the seal obtained with such a construction is less tight, the increase in pressure in the bowl during placement of the lid on the bowl in a conventional appliance can be sufficient to provoke a rise of liquid along the sleeve, so that the use of a tool having the characteristics cited above becomes desirable.

According to an advantageous embodiment, the lower drive element is coupled to the tube above the vent. The passage is then arranged at the periphery of or below the lower drive element.

According to another advantageous form construction, the lower drive element is arranged on the internal face of a wall of the tube. The passage can then consist, for example, of a groove provided in the internal face of a wall of the tube, or of a conduit placing the vent in communication with the lower axial opening.

Advantageously then, to permit processing of a larger quantity of liquid, the vent is arranged in the upper third of the hub.

Also advantageously, to facilitate the escape of air, the vent provides an upper opening in the outer wall.

Also advantageously, to facilitate the escape of air, the rotatable tool has two vents disposed at one side and the other of the axis of the hub.

Also advantageously, the hub carries a processing element, such as a tool, which can be removable or not. Alternatively, or in a complementary manner, the hub has a retaining element provided to receive a removable processing element.

Also advantageously, the vent is arranged above the sleeve. The vent is not necessarily disposed in line with the sleeve, but can be laterally offset therefrom. This arrangement facilitates the escape of air.

Also advantageously, the motor housing includes a control rod provided to actuate an on/off switch, the control rod being actuated by the intermediary of the lid. The appliance then offers a particularly simple operation.

BRIEF DESCRIPTION OF THE DRAWINGS

The invention will be better understood from a study of the three following exemplary embodiments, presented as non-limiting examples, and illustrated in the attached Figures.

DETAILED DESCRIPTION OF THE INVENTION

Figure 1:
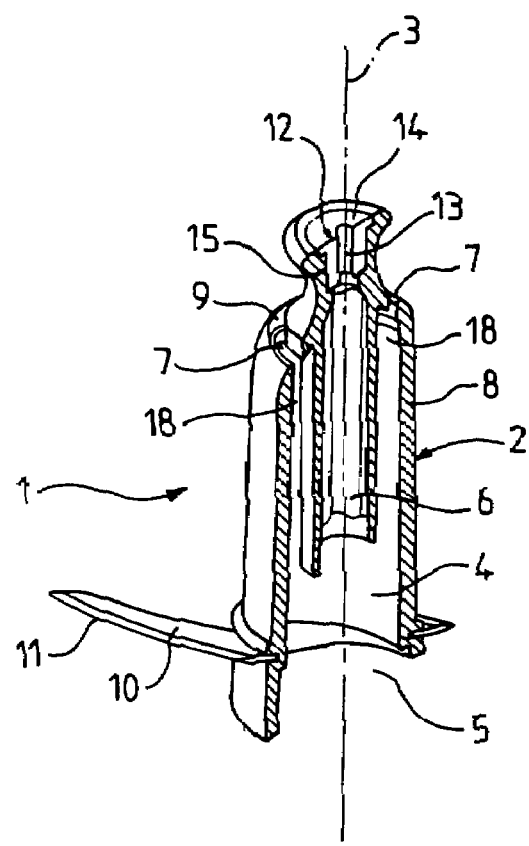
FIG. 1 is a cross-sectional perspective view of one exemplary embodiment of a rotatable working tool according to the invention.
Figure 2:
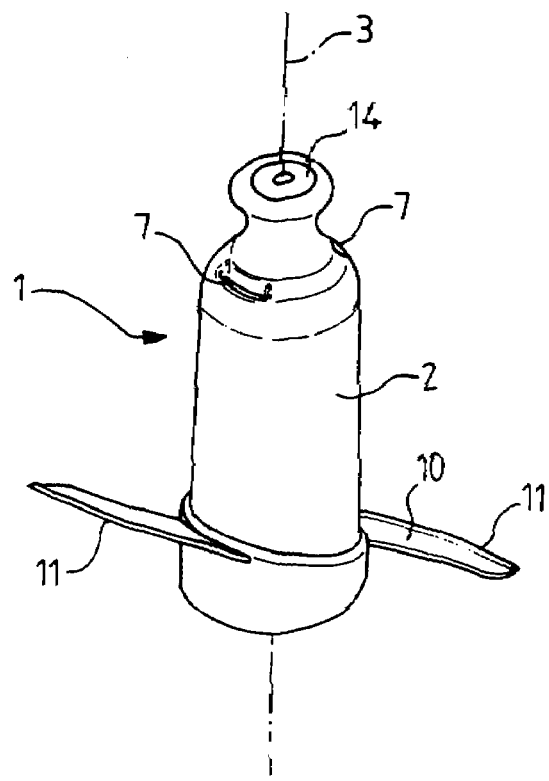
FIG. 2 is a perspective view of the working tool shown in FIG. 1.

The rotatable working tool 1 shown in FIGS. 1 and 2 includes a hub 2 that extends along a vertical axis 3. Hub 2 defines a tube 4 having, at its lower end, an opening 5 that extends across axis 3. Tool 1 also carries a working, or processing, member 10, such as cutting blades having sharp edges 11 at the leading edges of the blades. Member 10 is fixed to hub 2. Tool 1 further includes a drive element 6 located within tube 4. Drive element 6 is open at its lower end.

Two vents 7 are arranged in an outer wall 8 of hub 2 and communicate with opening 5 via a passage 18 that extends between wall 8 and element 6 and that is distinct from element 6. More particularly, passage 18 is arranged at the periphery of element 6 and is annular at least in the region where it is coextensive with element 6. Drive element 6 is connected to tube 4 at a location above vents 7, and element 6 is tubular.

Vents 7 are disposed in the upper third of hub 2 and each vent 7 forms an upper opening in outer wall 8. The two vents are preferably located diametrically opposite one another with respect to axis 3. Hub 2 has a shoulder 9 at the upper part of tube 4 and vents 7 are located in shoulder 9.

Tool 1 also has an upper guide element 12 that is provided with a bore 13 formed in an upwardly extending housing 15 of hub 2. Bore 13 extends along axis 3.

Figure 3:
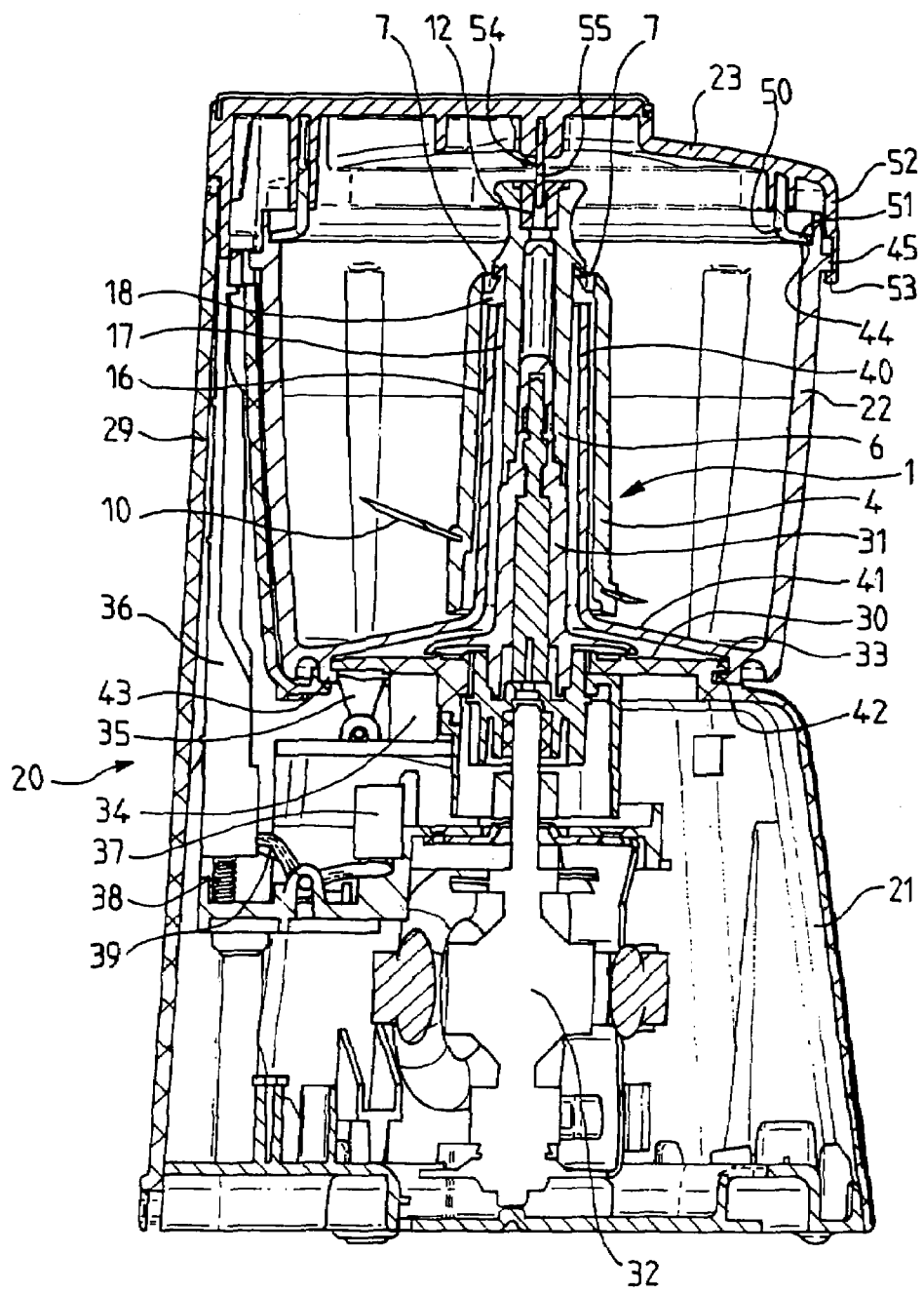
FIG. 3 is a cross-sectional view, in a vertical plane, of one embodiment of a household food preparation appliance according to the invention, containing the tool shown in FIGS. 1 and 2.

FIG. 3 shows the tool 1 of FIGS. 1 and 2 arranged in a household food preparation appliance 20 that includes a motor housing 21, a processing receptacle, or bowl, 22 and a lid 23.

Housing 21 provides a base 30 for bowl 22 and houses a drive shaft 31 that protrudes upwardly above base 30. A motor 32 installed in housing 21 is connected to rotate shaft 31, which extends through a hollow cylindrical sleeve 40 that extends upwardly from the bottom 41 of bowl 22.

When bowl 22 is mounted on base 30 and tool 1 is installed in bowl 22, tube 4 covers sleeve 40 and drive element 6 is driven by drive shaft 31. Vents 7 are advantageously arranged above sleeve 40 and an exterior annular space 16 is present between tube 4 and sleeve 40. An interior annular space 17 is present between sleeve 40 and both drive shaft 31 and drive element 6, element 6 being disposed atop shaft 31. Exterior annular space 16 communicates with interior space 17 via a space present above the top of sleeve 40.

Bowl 22 has lugs 42 at its bottom to engage in notches provided in base 30. Lugs 42 and notches 33 are constructed to form a bayonet type connector that allows bowl 22 to be secured to housing 21 by a rotational movement.

Bowl 22 also has a tongue 43 provided to act on a switch 34 arranged in the motor housing to interrupt the operation of the appliance in the absence of a bowl 22. More specifically, tongue 43 actuates switch 34 through the intermediary of a transmission member 35.

Lid 23 is provided with a sealing joint arranged to cooperate with bowl 22. Joint 50 has a lower lip 51 located to come to bear on an internal shoulder 44 of bowl 22. Lid 23 is secured on bowl 22 by a rotational movement. In order to secure lid 23 on bowl 22, lid 23 has a skirt 52 provided with inwardly extending lugs 53 arranged to engage beneath external lugs 45 on bowl 22. When lugs 53 are engaged under lugs 45, sealing joint 50 is slightly compressed and lid 23 is downwardly displaceable to a limited degree relative to bowl 22.

Lid 23 carries a centering element 54 disposed to cooperate with upper guide element 12 of tool 1. Centering element 54 has the form of a rod disposed to engage in bore 13. Motor housing 21 has a control rod 36 provided to act on a switch 37 and mounted for vertical movement against the restoring force of a biasing spring 38. More specifically, control rod 36 actuates switch 37 through the intermediary of a transmission member 39. Control rod 36 is housed in an upright member 29 of motor housing 21. Control rod 36 is actuated by lid 23 when bowl 22 is installed on base 30 and lid 23 is put in place to close bowl 22. At this time, pressure on lid 23 permits the appliance to be placed in operation.

The embodiment shown in FIG. 3 operates in the following manner. The user installs bowl 22 on base 30 and then installs tool 1 in bowl 22 and pours the liquid to be processed into bowl 22. Then the user places lid 23 on bowl 22 and presses downwardly on lid 23 in order to place the appliance into operation. Joint 50 permits a reduction in the volume of the enclosure formed by bowl 22 and lid 23, while maintaining the seal therebetween. Air present above the liquid can then escape through vents 7 and passage 18 in order to reach the space enclosed by sleeve 40 and then flow out of the appliance. If vents were not provided, the liquid present in bowl 22 would tend to rise through the exterior annular space 16 between tube 4 and sleeve 40, and to then flow into the region enclosed by sleeve 40 via interior annular space 17.

Figure 4:
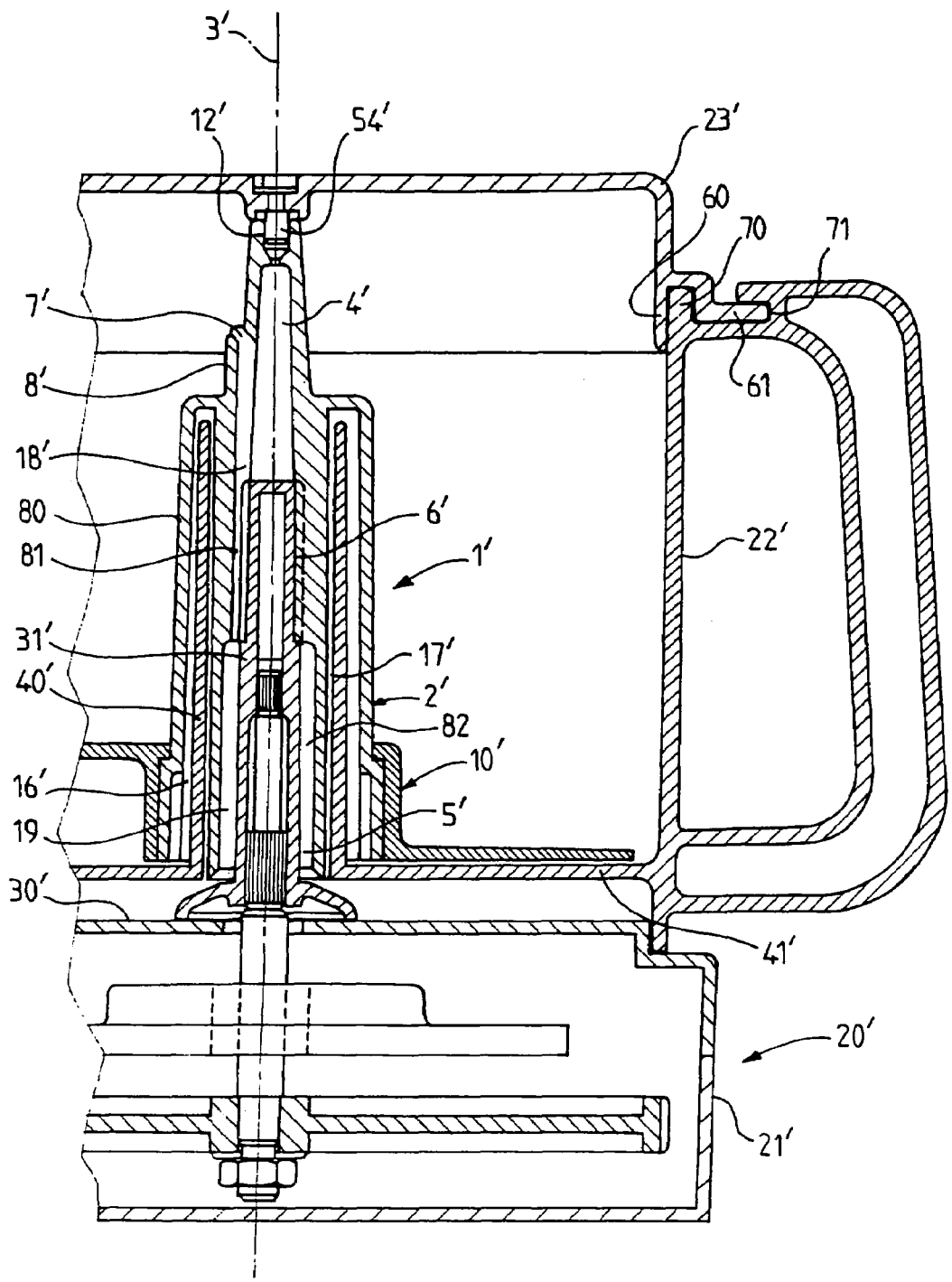
FIG. 4 is a partial cross-sectional view, in a vertical plane, of a second embodiment of a household food preparation appliance according to the invention.

The embodiment of a household food processing appliance 20' shown in FIG. 4 includes a motor housing 21', a processing receptacle, or bowl, 22' and a lid 23'.

Motor housing 21' forms a base 30' and has a drive shaft 31' that projects upwardly from base 30'. A motor (not shown in FIG. 4) installed in housing 21' rotates drive shaft 31' via a transmission. Operation of the appliance is controlled by a control button (not shown in FIG. 4).

Bowl 22' is provided with a sleeve 40' that extends upwardly from the base 41' of the bowl. Bowl 22' is advantageously latched onto base 30' by means of a bayonet type assembly, not shown in detail in FIG. 4.

Lid 23' includes a centering element 54' provided to cooperate with an upper guide element 12' of tool 1'.

In this embodiment, lid 23' is not provided with any sealing joint. Lid 23' has a lower rim 60 that comes to be housed against an upper edge 70 of bowl 22'. Lid 23' is latched onto bowl 22' by means of a bayonet type assembly. For this purpose, a tongue 61 extending from lid 23' engages in a housing 71 of bowl 22' after lid 23' has been rotated relative to bowl 22' into the latched position.

Tool 1' includes a hub 2' that extends along a vertical axis of rotation 3'. Hub 2' is formed to have a tube 4' provided with an opening 5' at its lower end. Opening 5' extends across axis 3'. Tool 1' also includes a processing member 10' removably mounted on hub 2'. Specifically, tool 10' is mounted on a tubular wall 80 surrounding tube 4'.

Tool 1' further includes a lower drive element 6' arranged at the interior of tube 4'. Drive element 6' has a tubular form. More specifically, lower drive element 6' is arranged on an internal face of a wall of tube 4'.

A vent 7' is provided in an outer wall 8' of hub 2' in the form of an opening in the upper part of wall 8'. Vent 7' is preferably arranged in the upper third of hub 2', and is arranged above wall 80. Vent 7' communicates with lower axial opening 5' via a passage 18'. Passage 18' is distinct from drive element 6'. More specifically, passage 18' consists of a groove 81 formed in the internal face of a wall of tube 4', extended by a bore 82 in the direction of axial opening 5'. Groove 81 extends along drive element 6'.

When bowl 22' is in place on base 30' and tool 1' has been installed in bowl 22', tube 4' of tool 1' will be inserted in sleeve 40' and drive element 6' will be driven by drive shaft 31'. Vent 7' is advantageously located above the upper end of sleeve 40'. An annular exterior space 16' is present between tubular wall 80 and sleeve 40' and an internal annular space 17' is present between sleeve 40' and tube 4'. Another internal annular space 19 is present between tube 4' and drive shaft 31', drive element 6' being disposed atop shaft 31'. Internal annular space 19 communicates with passage 18'.

The embodiment shown in FIG. 4 functions in the following manner. The user installs bowl 22' on base 30', then installs tool 1' in bowl 22' and pours the liquid to be processed into bowl 22'. The user then installs lid 23' on bowl 22' so that lower rim 60 of lid 23' comes to be housed against upper edge 70 of bowl 22', thus resulting in a reduction in the volume of the enclosure formed by bowl 22' and lid 23' while maintaining a certain seal between bowl 22' and lid 23'. In other words, lower rim 60 and upper edge 70 have a reduced amount of play. The air present above the liquid can then escape through vent 7' and then through passage 18' in order to reach sleeve 40' and flow out of the appliance. In the absence of vent 7', the small play existing between upper edge 70 of bowl 22' and lid 23' could be insufficient to permit the escape of air present above the liquid contained in bowl 22'. Liquid in bowl 22' would then tend to rise through annular space 16' between tubular wall 80 and sleeve 40', to then flow in this case into sleeve 40' via internal annular space 17'.

Figure 5:
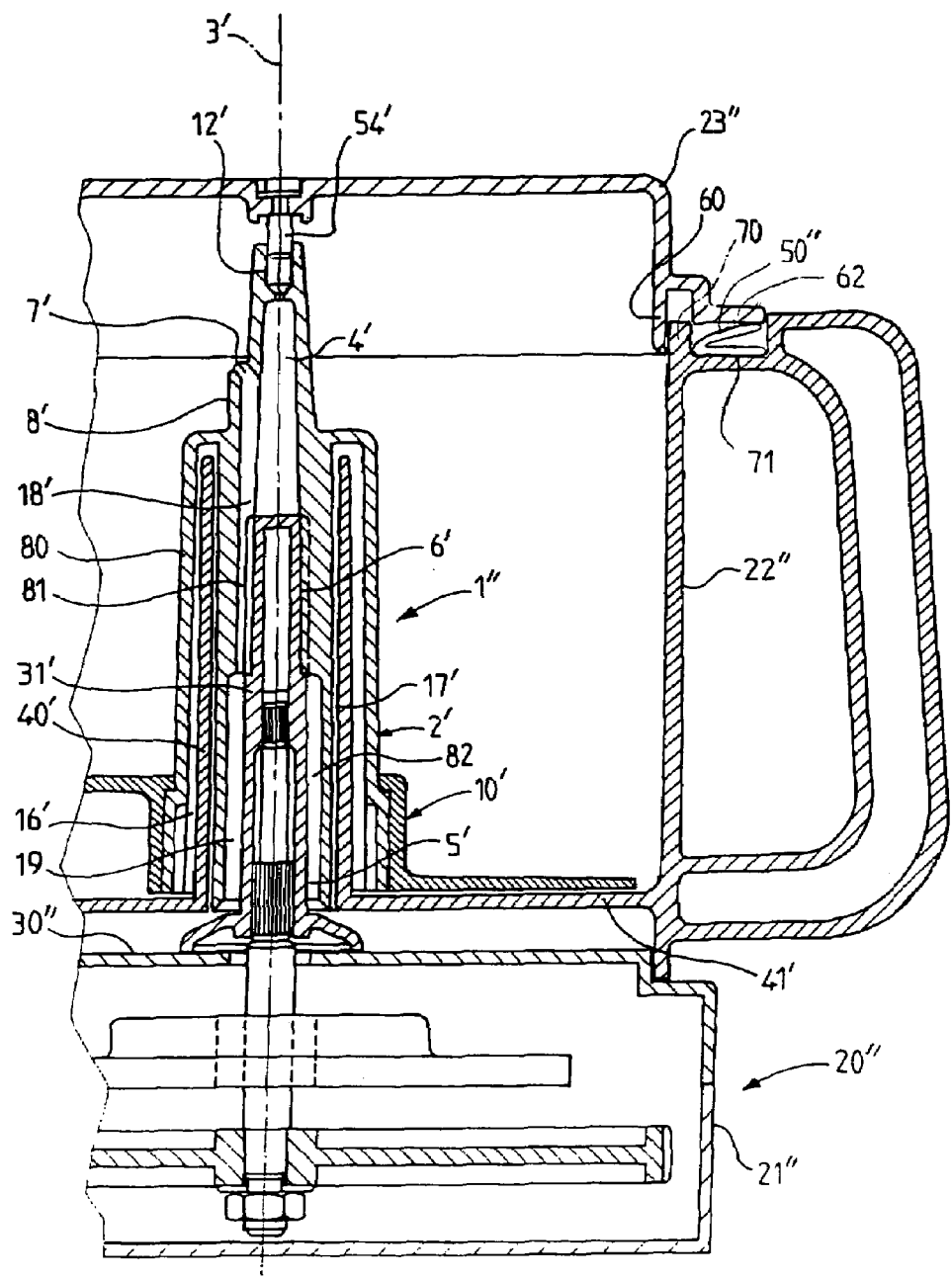
FIG. 5 is a partial cross-sectional view, in a vertical plane, of a third embodiment of a household food preparation appliance according to the invention.

The embodiment of a household food preparation appliance 20" illustrated in FIG. 5 includes a working tool 1" identical to working tool 1' of the embodiment shown in FIG. 4. Appliance 20" includes a motor housing 21" that differs from motor housing 21' in that it includes a control shaft provided to actuate a switch, not shown in FIG. 5, comparable to the elements of the embodiment shown in FIGS. 1-3. A sealing joint 50" is mounted between bowl 22" and lid 23". In this regard, bowl 22" and lid 23" differ from bowl 22' and lid 23' in that lid 23" has an annular, outwardly projecting wall 62 provided to rest on sealing joint 50", which is disposed in an annular groove 71 formed in bowl 22". Annular wall 62 is arranged outside of lower rim 60 of lid 23". Annular groove 71 is arranged at the periphery of upper edge 70 of bowl 22". More specifically, sealing joint 50" is a lip seal.

All of the elements shown in FIG. 5 with the same reference numeral as FIG. 4 are identical in structure and function to the corresponding elements in FIG. 4.

The present invention functions in the following manner. When bowl 22" is installed on base 30" of motor housing 21", tool 1" is placed over sleeve 40', and lid 23" is installed on bowl 22", pressure on lid 23" permits the appliance to be placed in operation. Annular wall 62 of lid 23" then compresses joint 50" in groove 71 and thus leads to a reduction in the volume of the enclosure formed by bowl 22" and lid 23" while retaining a certain seal. Evacuation of air through vent 7' is effectuated in the same manner as described in connection with the embodiment shown in FIG. 4.

Thus, because of vents 7, 7' arranged in outer wall 8, 8' of hub 2, 2' of working tool 1, 1', 1" communicating with lower axial opening 5, 5' via passage 18, 18' distinct from lower drive element 6, 6', lid 23, 23', 23" is capable of being installed on bowl 22, 22', 22" while creating a reduction in the volume of the enclosure formed by the bowl and the lid and retaining a certain seal, without provoking an upward displacement of liquid along sleeve 40, 40' of bowl 22', 22', 22". In other words, vents 7, 7' produce a pressure equalization between the interior of bowl 22, 22', 22" and the region around the bowl.

According to one variation, hub 2 can have a single vent 7, or, on the other hand, hub 2' can have several vents 7'.

According to another variation, hub 2 can carry a removable working member, or, in contrast, working tool 10' can be fixed to hub 2'.

According to another variation, passage 18' does not necessarily have a groove 81 formed in the internal face of a wall of tube 4', but can have, for example, a conduit placing vent 7' in communication with bore 82, this conduit being arranged in the wall of tube 4'.

According to another variation, different forms of construction of working tool 1, 1', 1", or of the connection between lid 23, 23', 23" and bowl 22, 22', 22", as well as control of the operation of the appliance can be combined in various ways.

According to another variation, sealing joint 50 can form a part independent of lid 23, or can be provided on bowl 22, and sealing joint 50 can be removable. Sealing joint 50" can be provided on bowl 22" or on lid 23".

Sealing joints 50 and 50" are lip seals. These joints are axially deformable annular joints. Joints 50 and 50" could be replaced by other types of axially deformable annular joints, particularly by O-rings.

The present invention is not in any way limited to the embodiments described and to their variations, but encompasses numerous modifications that would be understood by those skilled in the art and that are encompassed by the claims.

This application relates to subject matter disclosed in French Application number FR 04 13382, filed on Dec. 16, 2004, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A household food processing appliance comprising:
   a motor housing containing a motor and a drive shaft;
   a working bowl having a bottom and a hollow sleeve that extends upwardly from said bottom;
   a lid for closing said bowl so that said bowl and said lid enclose a volume; and
   a rotatable processing tool that comprises a hub that extends along an axis and has a lower end, said hub forming a tube having an opening that extends along the axis from said lower end, said tube being fitted over said sleeve when said appliance is to be placed in operation, said processing tool comprising a lower drive element constructed to be coupled to said drive shaft to be rotated by said motor, wherein:
   said lid is constructed to be placed on said bowl in a manner that leads to a reduction in the volume enclosed between said bowl and said lid while maintaining a degree of fluid tightness;
   said hub has an outer wall provided with at least one vent; and
   said hub encloses a passage that is distinct from said lower drive element and that extends between said at least one vent and said opening in said hub to allow escape of air from the volume, through said passage, to a region outside of said bowl.

2. The appliance of claim 1, further comprising a sealing joint mounted on one of said bowl and said lid for creating at least a partial seal therebetween.

3. The appliance of claim 1, wherein said lid has a lower rim that comes to lodge against an upper edge of said bowl, said lower rim and the upper edge having a reduced play therebetween.

4. The appliance of claim 1, wherein said lower drive element is connected to said tube at a location above said at least one vent.

5. The appliance of claim 1, wherein said lower drive element is arranged on the internal face of a wall of said tube.

6. The appliance of claim 1, wherein said vent is located in the upper one-third of the length of said hub along the axis.

7. The appliance of claim 1, wherein said vent forms an opening at the top of said outer wall of said hub.

8. The appliance of claim 1, wherein said at least one vent comprises two vents diametrically opposite one another relative to the axis.

9. The appliance of claim 1, wherein said processing tool further comprises a processing element carried by said hub.

10. The appliance of claim 1, wherein said vent is located above said sleeve.

11. The appliance of claim 1, wherein said motor housing includes a control rod provided to actuate an on/off switch, said control rod being actuated by said lid when said lid is placed on said bowl.

12. A household food processing appliance comprising:
a motor housing containing a motor and a drive shaft;
a working bowl adapted to be placed on said motor housing for processing food having a bottom and a hollow sleeve that extends upwardly from said bottom, said hollow sleeve enclosing a space having a bottom end that is open to a region outside said appliance when said bowl is mounted on said motor housing;
a lid for closing said bowl so that said bowl and said lid enclose a volume and a seal is formed between said lid and said bowl;
a rotatable processing tool that comprises a hub that extends along an axis and has a lower end, said hub forming a tube having an opening that extends along the axis from said lower end, said tube being fitted over said sleeve when said appliance is to be placed in operation, said processing tool comprising a lower drive element constructed to be coupled to said drive shaft to be rotated by said motor, wherein:
said lid is constructed to be placed on said bowl in a manner that leads to a reduction in the volume enclosed between said bowl and said lid while maintaining a degree of fluid tightness;
said hub has an outer wall provided with at least one vent; and
said hub encloses a passage that is distinct from said lower drive element and that extends through said sleeve between said at least one vent and said opening in said hub to allow escape of air from the volume, through said passage, to the region outside of said appliance.

13. The appliance of claim 12, further comprising a sealing joint mounted on one of said bowl and said lid for creating the seal therebetween.

14. The appliance of claim 12, wherein said lid has a lower rim that comes to lodge against an upper edge of said bowl, said lower rim and the upper edge having a reduced play therebetween.

15. The appliance of claim 12, wherein said lower drive element is connected to said tube at a location above said at least one vent.

16. The appliance of claim 12, wherein said lower drive element is arranged on the internal face of a wall of said tube.

17. The appliance of claim 12, wherein said vent is located in the upper one-third of the length of said hub along the axis.

18. The appliance of claim 12, wherein said vent forms an opening at the top of said outer wall of said hub.

19. The appliance of claim 12, wherein said at least one vent comprises two vents diametrically opposite one another relative to the axis.

20. The appliance of claim 12, wherein said processing tool further comprises a processing element carried by said hub.

21. The appliance of claim 12, wherein said vent is located above said sleeve.

22. The appliance of claim 12, wherein said motor housing includes a control rod provided to actuate an on/off switch, said control rod being actuated by said lid when said lid is placed on said bowl.

* * * * *